(12) United States Patent
Eastty

(10) Patent No.: US 6,744,788 B2
(45) Date of Patent: Jun. 1, 2004

(54) MULTIPLEXING DIGITAL SIGNALS

(75) Inventor: Peter Charles Eastty, Eynsham (GB)

(73) Assignee: Sony United Kingdom Limited, Weybridge (GB)

(*) Notice: Subject to any disclaimer, the term of this patent is extended or adjusted under 35 U.S.C. 154(b) by 0 days.

(21) Appl. No.: 09/400,504

(22) Filed: Sep. 21, 1999

(65) Prior Publication Data

US 2003/0179782 A1 Sep. 25, 2003

(30) Foreign Application Priority Data

Sep. 23, 1998 (GB) .............................. 9820759

(51) Int. Cl.[7] .............................. H04J 3/02; H04J 3/06
(52) U.S. Cl. .................. 370/509; 370/532; 370/537; 370/540
(58) Field of Search ................ 370/500, 509, 370/514, 515, 524, 532, 540, 464, 476, 498, 503, 504, 520, 522, 537

(56) References Cited

U.S. PATENT DOCUMENTS

| | | | | |
|---|---|---|---|---|
| 3,065,303 A | * | 11/1962 | Kaneko ...................... | 370/509 |
| 3,601,545 A | * | 8/1971 | Saburi ........................ | 370/347 |
| 3,710,056 A | * | 1/1973 | Tomozawa .................. | 370/514 |
| 3,920,900 A | * | 11/1975 | Fineman ..................... | 375/362 |
| 4,009,346 A | * | 2/1977 | Parker et al. ............... | 370/345 |
| 4,397,030 A | * | 8/1983 | Becker et al. .............. | 375/257 |
| 4,437,182 A | * | 3/1984 | Lambert et al. ............ | 370/524 |
| 4,736,371 A | * | 4/1988 | Tejima et al. ............... | 370/236 |
| 4,920,535 A | * | 4/1990 | Watanabe et al. ........... | 370/512 |
| 5,005,171 A | * | 4/1991 | Modisette et al. .......... | 370/333 |
| 5,184,348 A | * | 2/1993 | Abdelmouttalib et al. .. | 370/431 |
| 5,327,576 A | * | 7/1994 | Uddenfeldt et al. ........ | 370/522 |
| 5,335,228 A | | 8/1994 | Bottiglieri et al. | |
| 5,506,866 A | * | 4/1996 | Bremer et al. .............. | 370/207 |
| 5,778,000 A | * | 7/1998 | Dosiere et al. ............. | 370/512 |
| 5,793,760 A | * | 8/1998 | Chopping ................... | 370/355 |
| 5,941,936 A | * | 8/1999 | Taylor ........................ | 1/1 |

FOREIGN PATENT DOCUMENTS

| | | |
|---|---|---|
| EP | 0 486 874 | 5/1992 |
| WO | WO 93/25017 | 12/1993 |

* cited by examiner

*Primary Examiner*—Huy D. Vu
*Assistant Examiner*—Daniel Ryman
(74) *Attorney, Agent, or Firm*—Frommer Lawrence & Haug LLP; William S. Frommer; Hans R. Mahr

(57) ABSTRACT

Data transmission apparatus for multiplexing one or more channel data streams of equal, predetermined, data rate into a transmission data stream comprises: means for generating a control data stream of the same data rate as the channel data rate, in which first periodically repeating portions of the control data stream provide a synchronisation signal and second periodically repeating portions of the control data stream provide identification data specifying information about the channel data streams with reference to a predetermined ordering of the channel data streams; and means for multiplexing the control data stream with the one or more channel data streams in a cyclic pattern of equally-sized data portions so that a data portion from the control data stream is followed by data portions from each of the channel data streams according to the predetermined ordering of channel data streams.

21 Claims, 4 Drawing Sheets

MULTIPLEXING DIGITAL SIGNALS

BACKGROUND OF THE INVENTION

1. Field of the Invention

This invention relates to interfacing digital signals such as, for example, digital audio signals.

2. Description of the Prior Art

Several signal interface formats exist for defining the way in which digital signals are carried (e.g. by cables) from one place to another. Examples include the AES/EBU standard for audio signals, and the so-called "SDI" standard for audio/video signals.

These interface formats take into account the physical properties of the signal to be transmitted, such as its bit rate or bandwidth, the identification of components of the transmitted signal, such as the identification of different audio channels within a signal formed of multiple channels, and synchronisation of the received signals so that they can be correctly decoded.

In some interface formats, these matters can impose a large overhead on the data actually carried. For example, in an AES/EBU two channel interface there is a 62.5% overhead imposed to support formatting information. In other words, 62.5% of the data transmission rate is unavailable for carrying actual audio data. Similarly in the MADI 56 channel interface the overhead is 40%.

SUMMARY OF THE INVENTION

This invention provides data transmission apparatus for multiplexing one or more channel data streams of equal, predetermined, data rate into a transmission data stream, the apparatus comprising: means for generating a control data stream of the same data rate as the channel data rate, in which first periodically repeating portions of the control data stream provide a synchronisation signal and second periodically repeating portions of the control data stream provide identification data specifying information about the channel data streams with reference to a predetermined ordering of the channel data streams; and means for multiplexing the control data stream with the one or more channel data streams in a cyclic pattern of equally-sized data portions so that a data portion from the control data stream is followed by data portions from each of the channel data streams according to the predetermined ordering of channel data streams.

This invention also provides data reception apparatus for receiving a multiplexed transmission data stream having one or more channel data streams and a control data stream of equal, predetermined, data rate in a cyclic pattern of equally-sized data portions so that a data portion from the control data stream is followed by data portions from each of the channel data streams according to a predetermined ordering of channel data streams, the apparatus comprising: means for detecting first periodically repeating portions of the control data stream representing a synchronisation signal, thereby identifying the control data stream within the transmission data stream; means for detecting second periodically repeating portions of the control data stream providing identification data specifying information about the channel data streams with reference to the predetermined ordering of the channel data streams.

In the invention, a control channel of equal size to one of the data channels is provided to carry formatting and synchronisation information. By multiplexing the control channel and the data channels together in a predetermined cyclic order so that some information to identify the data channels within the data stream is implied, the data overhead of the system can be reduced in comparison to other formats. Indeed, for a two channel interface the invention implies a 33% overhead, much less than that of the AES/EBU format. For a 56 channel interface the invention implies a 1.75% overhead, much less than that of the MADI format.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
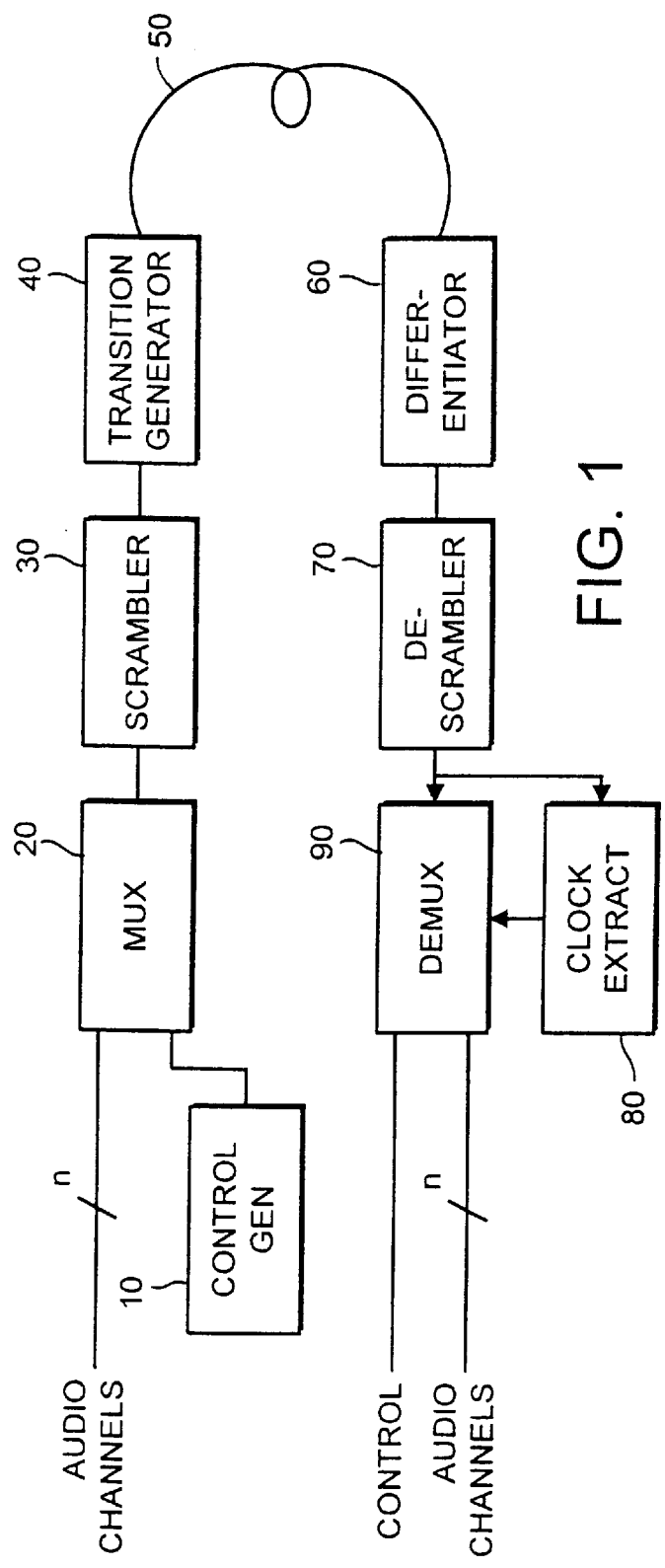
FIG. 1 schematically illustrates a digital signal transmission path formed of an output interface stage coupled to an input interface stage.

FIG. 1 schematically illustrates a digital signal transmission panel formed of an output interface stage coupled to an input interface stage.

The output interface stage comprises a control and synchronisation generator (10) a multiplexer (20), a data scrambler (30) and a transition generator (40). The output of the transition generator (40) is passed to a transmission line (50) such as a coaxial cable.

At a corresponding input stage at the far end of the transmission line (50) incoming signals are received by a differentiator (60), and are de-scrambled by a descrambler (70). The output of the descrambler is applied to a clock extractor (80) and a demultiplexer (90) which demultiplexes the various different signals in accordance with clock information supplied by the clock extractor. At the output of the demultiplexer n audio channels are output together with control information giving details of the audio channels and timing and synchronisation information to do with them.

Of the parts described above, the scrambler, transition generator, descrambler and differentiator will be described below with reference to FIGS. 2 to 5. The multiplexing and corresponding de-multiplexing operations will be described with reference to FIG. 6. Finally, the clock generation and clock extraction systems will be described with reference to FIGS. 7 and 8.

Figure 2:
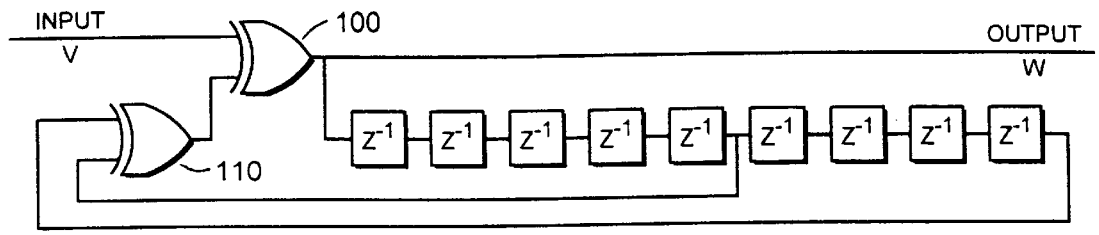
FIG. 2 schematically illustrates a scrambler circuit.

FIG. 2 schematically illustrates the data scrambler 30. The scrambler is intended to decorrelate data to be transmitted along the cable 50 from the data as input to the apparatus, and in particular serves to decorrelate any one-bit audio signals present in the bit stream from analogue representations of the same audio signals, thereby avoiding pick-up problems.

The input to the scrambler, signal V, is supplied to an exclusive-OR gate where it is combined with a pseudorandom digital signal to generate an output signal W.

The pseudorandom digital signal is in turn generated by combining two delayed versions of W, delayed by 5 and 9 bit periods respectively, in an exclusive-OR gate 110. So, the following expression can be used:

$$W = V * W^{-5} * W^{-9}$$

where * indicates an exclusive-OR operation and $P^{-n}$ signifies signal P delayed by n bit periods.

Figure 3:
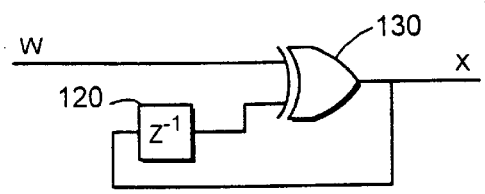
FIG. 3 schematically illustrates a transition generator circuit.

FIG. 3 illustrates the transition generator 40 which acts using known techniques to remove a polarity dependence from the transmitted data stream. The transition detector comprises a single delay unit 120 and an exclusive-OR gate 130 so as to implement the function:

$$X = W * X^{-1}$$

Figure 4:
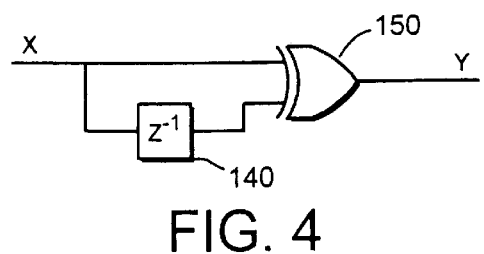
FIG. 4 schematically illustrates a differentiator circuit.

In corresponding fashion, in FIG. 4, the differentiator 60 receives the signal X and, using a single delay unit 140 and an exclusive-OR gate 150, implements the function:

$$Y = X * X^{-1}$$

Figure 5:
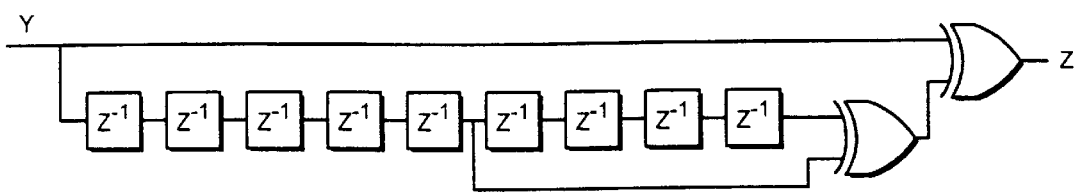
FIG. 5 schematically illustrates a descrambler circuit.

In FIG. 5, The data descrambler 70 operates in a substantially complementary manner to that of the scrambler 30, to recombine the received signal Y with a pseudorandom bit sequence derived from Y, so as to implement the function:

$$Z = Y * Y^{-5} * Y^{-9}$$

So, the signal Z should then be identical to the signal V originally supplied to the scrambler 30.

The operation of the data multiplexer 20 will now be described, but first, reference will be made to some of the characteristics of data to be transmitted using the present system.

Data channels are defined as "Individual Bitstreams" or IBs. Each IB has a bit rate of 64×44.1 kHz, i.e. 2822400 bits per second. This means that an IB can represent a one-bit digital audio signal operating at a sampling rate of 64×44.1 kHz (referred to as "64fs"), an AES/EBU channel where 64 bits are used to encode audio data at a sampling rate of 44.1 kHz, or any other signal at this bit rate.

IBs are identified by a number within a sequence of IBs (from 0 to NIB, the total number of IBs), and by an IB type (a code from 0 to 127). At least two IBs are transmitted, with IB 0 being a control channel, while IBs 1 to n are available for carrying data.

The different IB types will now be listed.

Type 0.

IB 0 is always of Type 0 and no other IB is ever of Type 0. The presence of a Type 0 IB thus allows for the synchronisation of the receiver demultiplexing circuitry. The detection of a Type 0 bitstream may thus be used as an indication of correct reception of a Signal according to the present format. The lack of reception of a Type 0 bitstream may be used as a reliable indicator of the lack of a Signal according to the present format (or the lack of synchronisation to an input Signal according to the present format) and the consequent requirement to mute any output signal derived from reception of a Signal according to the present format.

A Type 0 bitstream (and hence IB 0) has a repeating structure of 64 bits numbered from 0 to 63. Bits 2–63 inclusive are at present undefined, and bits 0 and 1 will now be described.

Type 0 Bit 0 (P1SYNC).

Type 0 Bit 0 (referred to as P1SYNC) recurs at the IB data rate divided by 64 or 2822400/64 which is 44100 bits/second. Thus the PCT clock rate of 44.1 kHz may be transmitted through the present interface by synchronising the generation of P1SYNC to an incoming 44.1 kHz clock and by generating at the receiver a 44.1 kHz clock synchronised to the arrival of P1SYNC.

It is the structure of P1SYNC which allows for the synchronisation of the receiver and the demultiplexing and decoding of the component IBs.

The overhead of one IB imposed by the format implies a 33% overhead for a two channel interface, an overhead of 14% for a six channel interface and an overhead of 1.75% for a 56 channel interface. These figures compare with the 62.5% overhead of the AES/EBU two channel interface or the 40% overhead of the MADI 56 channel interface.

Type 0 Bit 1 (P1CTRL).

Type 0 Bit 1 (referred to as P1CTRL) carries control information, specifically the types of all the IBs in the present use of the present interface.

The Type of each IB is encoded in an 8-bit sequence, a single bit '1' followed by a seven-bit binary number sent MSB first which contains the Type. Since IB 0 is always of Type 0 and only one IB may be of Type 0 the binary sequence of seven zeros "0000000" can only occur at one point in P1CTRL and serves as a synchronisation mark for the decoding of P1CTRL. The Type of each IB is sent in sequence. It is legal for more Type information to be transmitted in P1CTRL than is required by the presently used NIB, such excess Type information should follow the Type information for the used IBs and be of Type 127.

Type 1

An IB of Type 1 is the first (and possibly only) IB of an individual high-sample-rate audio signal. A single channel of 64FS (FS=44.1 kHz) single bit audio data is carried by a single IB of Type 1. The numerical significance of the bits sent in a Type 1 IB is 1.

Type 2

An IB of Type 2 is the second or subsequent of two or more IBs used to carry multiple bits of the same signal (i.e. a signal having a data rate of more than 2822400 bits per second can be multiplexed onto two or more IBs). The significance of a Type 2 IB is the same as that of the previous IB. Thus two single bit outputs from a dual 64FS ADC (both having the same polarity), or of a ternary representation, might be carried by a sequence of two IBs of Types 1 and 2.

Type 3

An IB of Type 3 is the second or subsequent of two or more IBs used to carry multiple bits of the same signal. The significance of a Type 3 IB is twice that of the previous IB. Thus the output of a three bit ADC operating at 64FS, would be carried by an LSB first sequence of three IBs of Types 1, 3 and 3.

Type 4

An IB of Type 4 is the first IB of a second (or subsequent) set of bits used to carry the same signal. A Type 4 IB always has a significance of one. Thus the output of two three bit ADCs operating in parallel on the same analogue signal and considered to be part of a single 64Fs digital signal, would be carried by a sequence of six IBs of Types 1, 3, 3, 4, 3 and 3.

Type 5

An IB of Type 5 is the first IB of a second (or subsequent) set of bits used to carry the same signal. A Type 5 IB always has a significance of minus one. Thus the output of two one bit ADCs operating differentially on the same analogue signal and considered to be part of a single 64Fs digital signal, would be carried by a sequence of two IBs of Types 1 and 5. The output of two three bit ADCs operating differentially on the same analogue signal and considered to be part of a single 64Fs digital signal, would be carried by a sequence of six IBs of Types 1, 3, 3, 5, 3 and 3.

Type 6

An IB of Type 6 begins a second (or subsequent) sample occupying a 64FS timeslot. A Type 6 IB always has a significance of one. Thus a 128FS signal would be carried by a sequence of two IBs of Types 1 and 6. A 256Fs signal would be a sequence of Types 1, 6, 6 and 6. A pair of one bit ADCs acting differentially at 128FS used to represent a single signal would be 1, 5, 6, and 5. It is normally that the sequence of Types following a Type 6 IB will be the same as that following the previous Type 1 or Type 6 IB. This assures that each sample of the signal is represented in the same way.

A Summary of Types 1 to 6

The properties of these Types may be summarised as follows.

| Type | Significance | Action |
|------|--------------|--------|
| 1 | 1 | Starts new signal |
| 2 | As previous | |
| 3 | Twice previous | |
| 4 | 1 | |
| 5 | −1 | |
| 6 | 1 | Increases sample rate by 64FS |

The intention of Types 1 to 6 is to allow the carriage of signals at 64FS or integer multiples thereof using unary, binary and/or differential representations.

Types 7 to 31

IBs of these Types are at Present Undefined.

Type 32

An IB of Type 32 carries AES/EBU two channel (64 bit) PCM data. Only the 44.1 kHz sampling rate of AES/EBU is supported. A Type 32 bitstream has a repeating structure of 64 bits numbered from 0 to 63. As noted above, Bit 0 of a Type 32 IB will be in synchronism with Bit 0 of IB 0 (IPSYNC).

The mapping from the AES/EBU format (including preambles, sync etc) is as follows. Note that this mapping takes advantage of the fact that the position of the start of the 64-bit frame is known.

Bits 4–31 and bits 36–63 of a Type 32 IB are identical to the same bits in the AES/EBU interface. Only bits 0–3 and 32–35 differ in that they carry an encoding of the AES/EBU preamble types.

The rules used to encode the AES/EBU preambles are as follows.

| Preamble Type | Channel | Biphase Mark | Encoded Preamble |
|---------------|---------|--------------|------------------|
| X | A | 11100010 or 00011101 | 0010 |
| Y | B | 11100100 or 00011011 | 0100 |
| Z | A/Block Start | 11101000 or 00010111 | 1000 |

Types 33 to 62

IBs of these Types are at Present Undefined.

Type 63

Type 63 Simply Marks an Unused IB.

Type 64

Type 64 is Undefined.

Types 65 to 126

An IB of Type 65 to 126 marks a muted IB of the type whose value is 64 less than the type under consideration. The bit of significance 64 in the Type number simply indicates "Muted". The implied Type information (held in the lower 6 bits of Type) may however be used by the receiving circuitry to prepare the appropriate output (and any equipment fed from it) to receive information of that type.

The effect of a Type greater than 64 is to allow the type of an IB to be changed without producing unwanted noises at the output of the receiver, for instance from Type 1 to type 32 via the sequence 1→65→96→32. This sequence induces the following action in the receiver:

| Type | Action |
|------|--------|
| 1 | Audio signal at 64FS transmitted. |
| 65 | Receiver mutes 64FS output. |
| 96 | Receiver changes output mode to AES/EBU, muted. |
| 32 | Receiver un-mutes AES/EBU output. |

Type 127

Type 127 Simply Marks an Unused IB.

So, each bitstream supplied to the multiplexer 30 has an associated IB type and an associated IB number from 1 to NIB. The type 0 IB (i.e. IB 0) is generated by the control generator 10.

Figure 6:
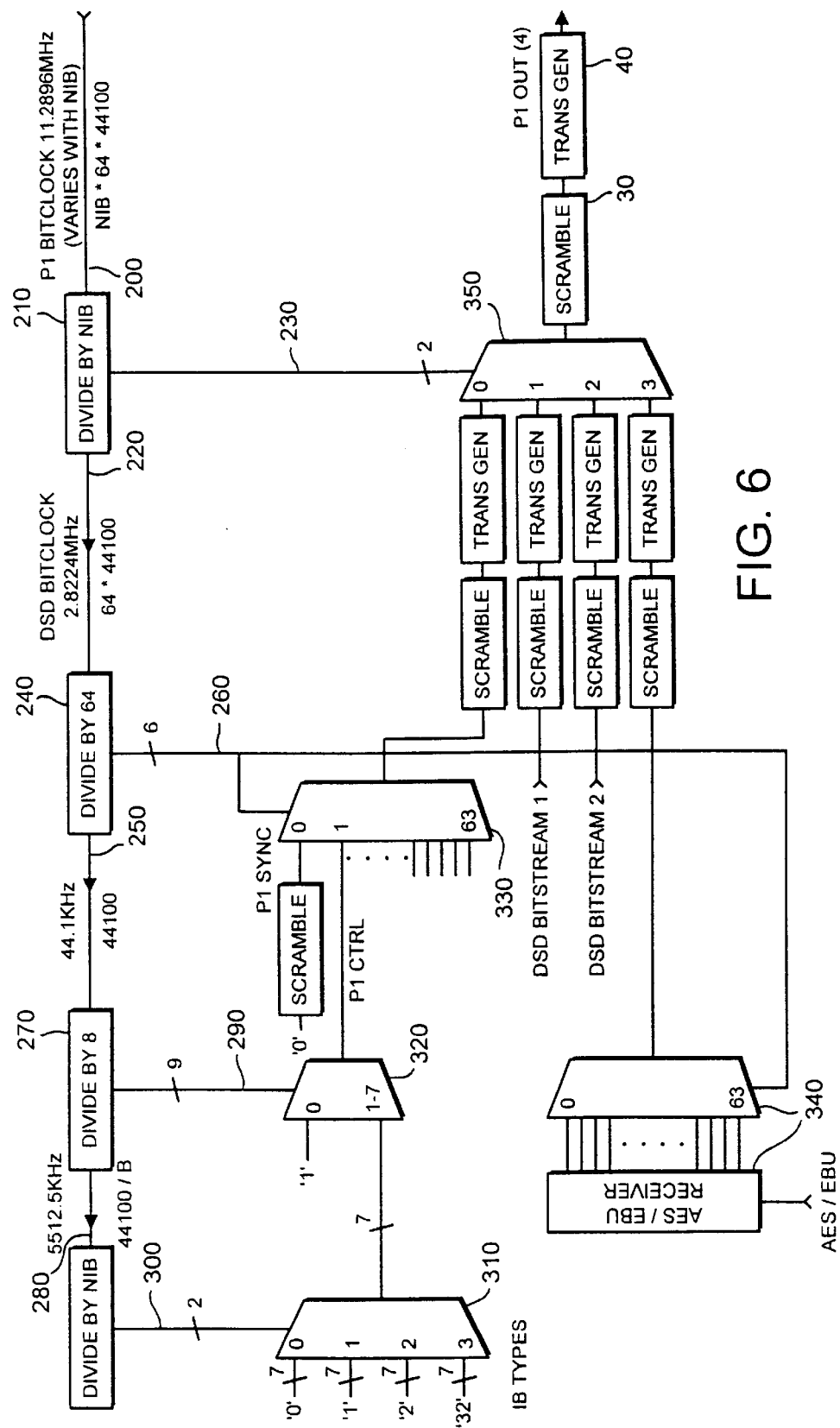
FIG. 6 schematically illustrates a data multiplexer.

Referring now to FIG. 6, a bitclock 200 is provided or generated, having a clock rate equal to NIB×64×44100. In the example of FIG. 6, NIB is 4 so the bitclock is at 11.2896 MHz. The bitclock is supplied to a divider 210 where it is divided by NIB. The divider 210 generates two outputs: one is an IB bitclock 220 at 2.8224 MHz, and the other is a multiplex control signal 230 which counts cyclically from 0 to NIB at the rate of the bitclock 200.

The IB bitclock is supplied to a further divider 240 where it is divided by 64 to generate a 44.1 kHz clock 250 and, as before, a six-bit multiplex control signal 260 which counts cyclically from 0 to 63 at the rate of the IB clock 220.

The 44.1 kHz clock is then supplied to another divider 270 where it is divided by 8 to generate a 5512.5 kHz clock 280 and a three-bit multiplex control signal 290 which counts cyclically from 0 to 7 at the rate of the 44.1 kHz clock.

Finally, the 5512.5 kHz clock 280 is divided by NIB to form a two-bit multiplex control signal 300 which counts cyclically from 0 to NIB at the rate of the 5512.5 kHz clock.

Seven bit data specifying the IB types is received by an NIB-way multiplexer 310 which cycles through the set of four NIB types. In this example, there are four IBs: a type 0 (control) IB, two type 1 IBs carrying one-bit digital audio data (so-called "DSD data) and a type 32 IB carrying a multiplexed AES/EBU PCM signal.

The output of the multiplexer 310 is passed to another multiplexer 320 where the seven bit words specifying the IB types are serialised, with a 1 being inserted at every eighth bit. These are passed to a further multiplexer 330 as bit one of IB 0, i.e. P1CTRL referred to above. P1SYNC is supplied to the multiplexer 330 to form bit 0 of IB 0. The remaining bits of IB 0 are at present undefined, but would be added in at the multiplexer 330. The multiplexer 330 has the effect of serialising the 64 bits of IB 0.

The serial IB 0 data, together with two type 1 IBs (IBs 1 and 2) and a serialised version of the AES/EBU audio signal (serialised by a receiver and multiplexer 340) are scrambled and subjected to a transition generator before being supplied to a multiplexer 350 where a serial bitstream is formed from all four IBs. Finally, the serial bitstream is scrambled 30 and supplied to the transition generator 40.

In the entire apparatus of FIG. 6, a very small delay of perhaps one period of the IB clock is imposed on the data streams.

So, in the output bitstream, every fourth bit comes from the same IB, so the bitstream looks like:

(bit from IB 0) (bit from IB 1) (bit from IB 2) (bit from IB 3) (bit from IB 0) . . .

Within the bits from an individual IB, these either progress through the received bits as in the case of a continuous DSD signal, or cycle through bits 0 to 63 of successive words in the case of 64-bit signals such as IB 0 and the AES/EBU signal.

Groups of eight successive bit 1s from IB 0 specify the types of the various IBs being transmitted. The type code for IB 0 itself comes first, followed by the type code for IB 1 and so on, cycling through the set of IBs from 0 to NIB. Since the code for IB 0 is unique in that it is the only code to contain seven adjacent zeroes, this can be used at the receiver to synchronise the decoding of the IB types for the remaining IBs.

Figure 7:
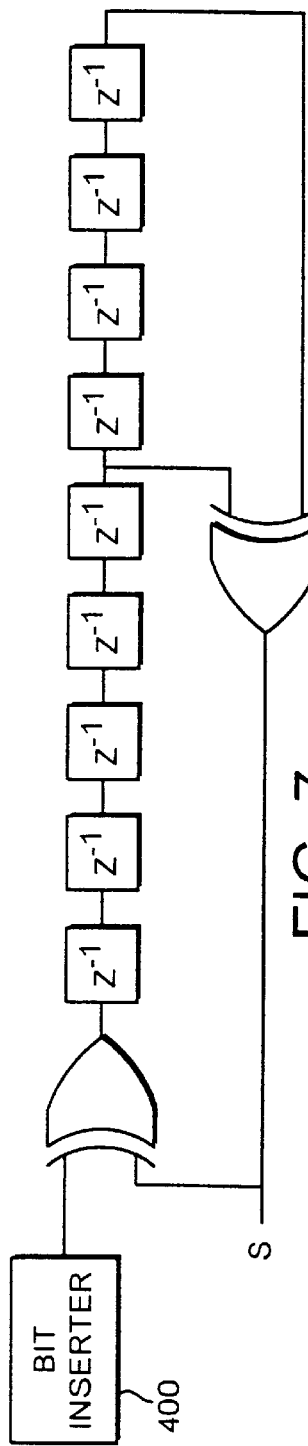
FIG. 7 schematically illustrates a clock generator.

FIG. 7 schematically illustrates a circuit for generating the clock signal P1SYNC. It is basically similar to the scrambler circuit described earlier, but is fed from a bit inserter 400. The bit inserter 400 inserts zeroes into the chain of delay units, apart from in a start-up state where a number of ones (e.g. 9 ones) are fed in to avoid an initial lock-up condition.

After the initial start-up condition, the output S of the circuit of FIG. 7 may be represented as:

$$S = S^{-5} * S^{-9}$$

As described above, the clock signal is multiplexed into the bitstream in one bit (bit 0 of IB 0) occurring every (64×NIB) bits in the bitstream. So, in order to synchronise with the transmitter clock and so decode the received data correctly, at the receiver, a correlation is carried out to detect the presence of the clock signal in each of the NIB*64 possible bit positions using the circuit of FIG. 8.

Figure 8:
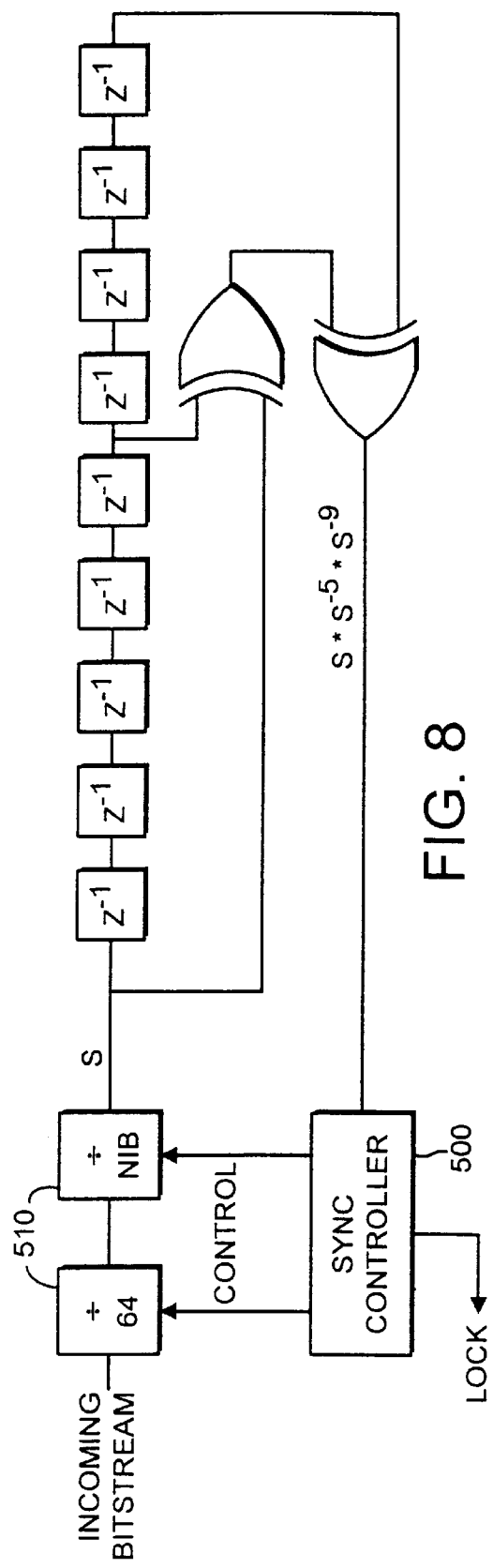
FIG. 8 schematically illustrates a clock extractor.

In FIG. 8, the incoming bitstream is divided by NIB and by 64, at a bit position relative to the rest of the bitstream set by a synchronisation controller 500. The output of the division stage, S, is then subjected to processing to generate:

$$S * S^{-5} * S^{-9}$$

If this expression is consistently zero, then the correct bit position for bit 0 of IB 0 has been found, and the remaining IBs can be decoded with respect to that bit position. The synchronisation controller transmits locking information to the remainder of a receiver circuit, which demultiplexes the bitstream in a complementary manner to the apparatus of FIG. 6.

If the output $S*S^{-5}*S^{-9}$ is not zero, then the synchronisation controller causes the dividers 510 to displace by one bit so that another possible bit position is examined, and so on.

It transpires form the mathematics behind the process that correlation needs to be tested for only about 11 bits before a relatively confident answer can be obtained as to whether the incoming bitstream at that position correlates with the transmitter clock. So, synchronisation can be achieved in a very short time.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Data transmission apparatus for multiplexing one or more channel data streams of equal, predetermined, data rate into a transmission data stream, said apparatus comprising:
    means for generating a control data stream of said same data rate as the channel data rate, in which first periodically repeating portions of said control data stream provide a synchronization signal and second periodically repeating portions of said control data stream provide identification data specifying information about said channel data streams in the same order as a predetermined ordering of said channel data streams, wherein the synchronization signal is multiplexed into the control data stream in one data portion occurring every first number of bits, where the first number of bits is equal to a number of channels in the channel data streams multiplied by a number of data portions used to encode the data; and
    means for multiplexing said control data stream with said one or more channel data streams in a cyclic pattern of equally-sized data portions so that a data portion from said control data stream is followed by data portions from each of said channel data streams according to said predetermined ordering of said channel data streams,
    where said identification data specifies a type code for each channel data stream.

2. Apparatus according to claim 1, in which each data portion comprises one data bit.

3. Apparatus according to claim 1, in which said identification data comprises a cyclic series of data words specifying properties of each channel data stream according to said predetermined ordering of said channel data streams.

4. Apparatus according to claim 3, in which said cyclic series of said identification data includes a synchronisation data word to indicate a predetermined position within said cyclic series of data words.

5. Apparatus according to claim 1, in which said channel data streams carry one bit digital audio data.

6. Apparatus according to claim 1, in which said predetermined data rate is 2822400 bits per second.

7. Apparatus according to claim 1, where said second periodically repeating portions of said control data stream provide said identification data for each channel data stream over a respective plurality of repetitions.

8. Apparatus according to claim 1, where each repetition of said second periodically repeating portions of said control data stream provides said identification data for a respective channel data stream.

9. Apparatus according to claim 1, where:
    said control data stream cycles through a plurality of bits making up a control word,
    said first periodically repeating portions of said control data stream are formed from a first bit block of each control word,
    said second periodically repeating portions of said control data stream are formed from a second bit block of each control word,
    said synchronization signal is formed from the first bit block of a plurality of control words, and
    said identification data for a corresponding channel data stream is formed from the second bit block of a plurality of control words.

10. Apparatus according to claim 9, where said first bit block is a single bit.

11. Apparatus according to claim 9, where said second bit block is a single bit.

12. Data reception apparatus for receiving a multiplexed transmission data stream having one or more channel data stream and a control data stream of equal, predetermined, data rate in a cyclic pattern of equally-sized data portion so that a data portion from said control data stream is followed by data portions from each of said channel data streams according to a predetermined ordering of channel data streams, the apparatus comprising:

means for detecting first periodically repeating portions of said control data stream representing a synchronization signal, thereby identifying said control data stream within said transmission data stream, wherein the synchronization signal controls dividing each channel data stream by a number of channels in the channel data streams and by a number of data portions used to encode the data and wherein the synchronization signal has been multiplexed into the control data stream in one data portion occurring every first number of bits, where the first number of bits is equal to a number of channels in the channel data streams multiplied by a number of data portions used to encode the data;

means for detecting second periodically repeating portions of said control data stream providing identification data specifying information about said channel data streams in the same order as said predetermined ordering of said channel data streams, where said identification data specifies a type code for each channel data stream.

13. Apparatus according to claim 12, in which each data portion comprises one data bit.

14. Apparatus according to claim 12, in which said identification data comprises a cyclic series of data words specifying properties of each channel data stream according to said predetermined ordering of said channel data streams.

15. Apparatus according to claim 14, in which said cyclic series of said identification data includes a synchronization data word to indicate a predetermined position within said cyclic series of data words.

16. Apparatus according to claim 12, where said second periodically repeating portions of said control data stream provide said identification data for each channel data stream over a respective plurality of repetitions.

17. Apparatus according to claim 12, where each repetition of said second periodically repeating portions of said control data stream provides said identification data for a respective channel data stream.

18. Apparatus according to claim 12, where:

said control data stream cycles through a plurality of bits making up a control word, said first periodically repeating portions of said control data stream are formed from a first bit block of each control word, said second periodically repeating portions of said control data stream are formed from a second bit block of each control word, said synchronization signal is formed from the first bit block of a plurality of control words, and said identification data for a corresponding channel data stream is formed from the second bit block of a plurality of control words.

19. Apparatus according to claim 18, where said first bit block is a single bit.

20. Apparatus according to claim 18, where said second bit block is a single bit.

21. A data transmission system comprising:

a data transmission apparatus for multiplexing one or more channel data streams of equal, predetermined, data rate into a transmission data stream, said apparatus comprising:

means for generating a control data stream of said same data rate as the channel data rate, in which first periodically repeating portions of said control data stream provide a synchronization signal and second periodically repeating portions of said control data stream provide identification data specifying information about said channel data streams in the same order as a predetermined ordering of said channel data streams, wherein the synchronization signal is multiplexed into the control data stream in one data portion occurring every first number of bits, where the first number of bits is equal to a number of channels in the channel data streams multiplied by a number of data portions used to encode the data; and means for multiplexing said control data stream with said one or more channel data streams in a cyclic pattern of equally-sized data portions so that a data portion from said control data stream is followed by data portions from each of said channel data streams according to said predetermined ordering of said channel data streams; and a data apparatus for receiving a multiplexed transmission data stream having one or more channel data streams and a control data stream of equal, predetermined, data rate in a cyclic pattern of equally-sized data portions so that a data portion from said control data stream is followed by data portions from each of said channel data streams according to said predetermined ordering of said channel data streams, the apparatus comprising:

means for detecting first periodically repeating portions of said control data stream representing a synchronization signal, thereby identifying said control data stream within said transmission data stream, wherein the synchronization signal controls dividing each channel data stream by a number of channels in the channel data streams and by a number of data portions used to encode the data;

means for detecting second periodically repeating portions of said control data stream providing identification data specifying information about said channel data streams in the same order as said predetermined ordering of said channel data streams, where said identification data specifies a type code for each channel data stream.

* * * * *